United States Patent
Kobayashi et al.

(10) Patent No.: US 6,819,827 B2
(45) Date of Patent: Nov. 16, 2004

(54) OPTICAL PATH SWITCHING APPARATUS

(75) Inventors: Morio Kobayashi, Yokohama (JP);
Masayuki Togawa, Yokohama (JP);
Junichirou Asano, Yokohama (JP);
Tsutomu Takahashi, Yokohama (JP);
Yoshinori Oonuma, Yokohama (JP);
Masahiro Kanbara, Yokohama (JP)

(73) Assignee: Teijin Seiki Co., Ltd., Tokyo (JP)

( * ) Notice: Subject to any disclaimer, the term of this patent is extended or adjusted under 35 U.S.C. 154(b) by 178 days.

(21) Appl. No.: 10/176,690

(22) Filed: Jun. 24, 2002

(65) Prior Publication Data

US 2002/0197003 A1 Dec. 26, 2002

(30) Foreign Application Priority Data

Jun. 25, 2001 (JP) ......................................... 2001-191522

(51) Int. Cl.$^7$ ................................................ G02B 6/35
(52) U.S. Cl. ............................................ 385/18; 385/17
(58) Field of Search ...................................... 385/16–18

(56) References Cited

U.S. PATENT DOCUMENTS 6,259,835 B1    7/2001  Jing
6,345,132 B1 *  2/2002  Picard et al. .................. 385/18
6,574,388 B2 *  6/2003  Laor ............................ 385/18

OTHER PUBLICATIONS

J. Minowa et al., Nonblocking 8×8 Optical Matrix Switch for Fibre–Optic Communications, Electronic Letters, May 22, 1980, pp. 422–423.

* cited by examiner

Primary Examiner—Hemang Sanghavi
Assistant Examiner—Omar Rojas
(74) Attorney, Agent, or Firm—Venable LLP; Andrew C. Aitken

(57) ABSTRACT

The disclosed herein is a novel and less expensive optical path switching apparatus for switching at least one input optical path selectively into at least one output optical path which comprises; switching means for switching the input optical path selectively into the output optical path which has at least one switching optical path to permit a light beam to pass thereon, inputting means for inputting at least one light beam to the switching means, and outputting means for outputting at least one light beam from the switching means, the switching means being essentially consisting of (i) a housing, (ii) at least one switching element having a first reflection surface to reflect the light beam inputted from each of input optical paths and a second reflection surface to reflect the light beam reflected from the first reflection surface toward the output optical path of the outputting means, and a reflection space formed between the first and second reflection surfaces of a switching element body, and (iii) at least one actuation element to actuate the optical path switching element for assuming two different positions including, a first position in which the input optical path of the inputting means is switched to the output optical path and a second position in which the input optical path is not switched to the output optical path of the outputting means.

14 Claims, 11 Drawing Sheets

F I G. 6B
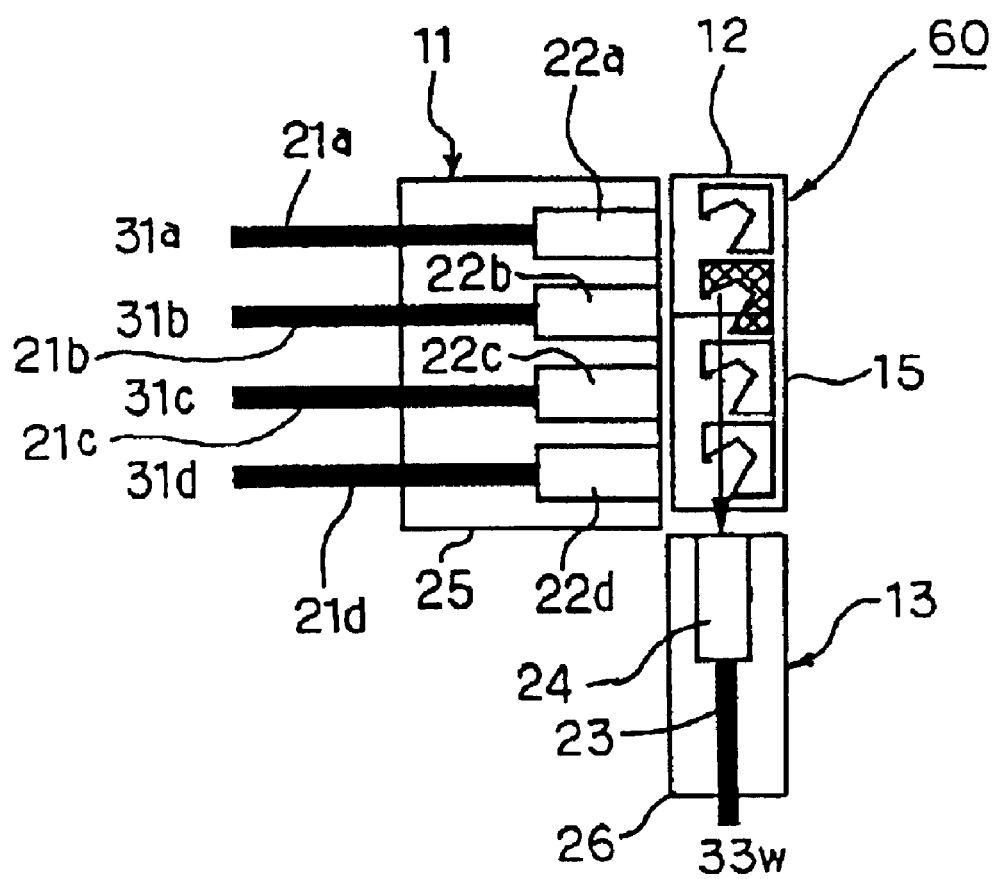

OPTICAL PATH SWITCHING APPARATUS

BACKGROUND OF THE INVENTION

1. Field of the Invention

The present invention relates to an optical path switching apparatus for switching at least one input optical path selectively into any one of output optical paths to permit a light beam to pass therethrough, and more particularly to an optical path switching apparatus available for a two-way optical communications system to have a plurality of communications devices selectively communicate with each other by switching at least one input optical path selectively into any one of output optical paths to permit a light beam to pass therethrough.

2. Description of the Related Art

Up until now, there have been proposed a wide variety of optical path switching apparatuses as will be seen for example from pages 442–423, vol. 16, No. 11 of ELECTRONICS LETTERS, published 22nd May 1980. The conventional optical path switching apparatus disclosed by the above ELECTRONICS LETTERS is shown in FIGS. 7 to 10. The conventional optical path switching apparatus thus shown comprises switching means 5 for switching input optical paths selectively into any one of the output optical paths, the switching means 5 having a plurality of switching paths to permit a plurality of light beams to respectively pass therethrough, inputting means 1 for inputting a plurality of light beams to the switching means 5, the inputting means 1 having a plurality of input optical paths formed therein to have a plurality of light beams respectively pass therethrough, and outputting means 3 for outputting a plurality of light beams from the switching means 5, the outputting means 3 having a plurality of output optical paths formed therein to have a plurality of light beams respectively pass therethrough.

The inputting means 1 is constituted by an optical fiber collimator array made of optical fibers and following input collimator lenses for converting each of incident light beams to paralleled light beams, respectively. The outputting means 3 is constituted by an optical fiber collimator array made of output collimator lenses respectively followed by output optical fibers for converting each of light beams to paralleled outputting light beams.

As shown in FIGS. 7 and 8, the switching means 5 has a housing 7, a plurality of optical path switching elements 2 accommodated in the housing 7 in which each of the input optical paths is switched into any one of the output optical paths, and a plurality of actuation elements 4 to actuate respectively the corresponding optical path switching elements 2. Each of the optical path switching elements 2 is actuated and moved by each of the actuation elements 4 to assume two different positions, i.e., a first position where each of the input optical paths of the inputting means 1 is switched to any one of the output optical paths of outputting means 3 and a second position where each of the input optical paths of the inputting means 1 is not switched to any one of the output optical paths of outputting means 3.

In the conventional optical path switching apparatus, each of the optical path switching elements 2 of the switching means 5 is constituted by a pentagonal prism made of glass, and it is well known that the pentagonal prisms has excellent optical properties and functions as the optical path switching element. The pentagonal prism of the optical path switching element 2 is illustrated in FIGS. 9 and 10. The pentagonal prism has two reflection surfaces including a first reflection surface ε on which a light beam from the input optical path of the inputting means 1 is reflected and a second reflection surface γ on which the light beam from the first reflection surface is reflected again to proceed toward the output optical path of the outputting means 3. The optical path of the light beam in the optical path switching apparatus is indicated by arrow in the drawings. First and second reflection surfaces γ and ε of the pentagonal prism are spaced apart from each other at an angle of 45 degrees to reflect at right angles the light beam from the inputting means 1 to the optical path of the outputting means 3, as shown in FIG. 9. The pentagonal prism also has two transmission surfaces including a first transmission surface β to have the light beam from the input optical path of the inputting means 1 transmit into the pentagonal prism and a second transmission surface α to have the light beam reflected on the reflection surfaces transmit from inside of the pentagonal prism to the output optical path of the outputting means 3.

In the pentagonal prism, an angle φ between any input optical path and any output optical path. are constantly maintained at 90 degrees, even if a set-up angle θ of the pentagonal prism is eventually fluctuated from a predetermined angle. This means that the input optical paths are precisely switched to any one of the output optical paths, at any time.

The pentagonal prism placed in the conventional optical path switching apparatus is usually prepared by a process that a glass block is cut and polished to form a pentagonal shape having surfaces α, β, γ, ε and δ, as shown in FIGS. 9 and 10. The surfaces γ and ε are coated with reflective multi layers and surfaces α and β are coated with unreflective multi layers. With regard to the surface δ of the pentagonal prism, any coating is not applied thereon because the surface δ is independent from switching of optical paths.

As to the surfaces γ and ε, a reflective coating is essential because, if any reflective coating is not applied thereon, an incident angle of the inputted light beam onto the surfaces is smaller than an internal reflection of glass and air, per se, and therefore the inputted light beam is hardly reflected there. So, the surfaces γ and ε must be coated by reflective dielectric multi layers. On the other hand, the unreflective coatings on the surfaces α and β are required, because, if any unreflective coating is not applied on the surfaces, it is not avoidable to reflect some amount of the inputted light beam on the each surface. For example, about 4% of the inputted light beam is reflected and lost at each of the surfaces α and β, respectively, when reflection index of air is 1.0 and the same of glass is 1.5. Such reflections on the surfaces α and β invite problems of back reflection of the inputted light beam, which a part of the introduced light beams returns to back truck, and cause to arise unstable signals in optical communications devices. It is, therefore, required to prevent from any reflection of the light beams on the surfaces α and β by applying an unreflective coating of dielectric multi layers.

As a light having a broad range of wave length of 1.3 μm to 1.6 μm is generally used in optical communications technology, reflective coatings or unreflective coatings of the surfaces are extremely essential when the inputted light beam has such broad wave length. In order to meet above requirements, a coating of dielectric multi layers such as thin layers of $SiO_2$ and of $TiO_2$ are applied on the surfaces by vacuum deposition method or the like. The materials of such thin layers are selected in accordance with aims of the coating.

The pentagonal prism should be as small as possible in order to miniaturize the switching apparatus and to offer technical advantage thereby. Area of the each surfaces α, β, γ and ε on the pentagonal prism is preferable as small as 1 square millimeter or smaller than this. In order to manufacture such small sized pentagonal prism, however, high degree of polishing techniques for glass material and high degree of coating techniques to form reflective and unreflective layers are necessary. Further, it is needed to take a complicated manufacturing process, since such small surfaces α, β, γ and ε are able to be formed only by high-precision processing technology and they should be coated selectively to form the reflective or unreflective layers. The difficulties raise a high cost for making the pentagonal prism and consequently the conventional optical path switching apparatus becomes very expensive.

In some other technical fields, a coating of a thin gold layer is known as alternative of the expensive coating of dielectric multi layers. For coating of a thin gold layer, metal vapor deposition method or spattering method is available and the method is easy to operate and not so expensive. However, the reflection index of coated gold layer is 98% or less and is lower than that of the dielectric multi layers having a reflection index of approximately 100%. Further, when the gold layer is coated, surfaces of glass material of the prism are previously undercoated with Cr layer and thereafter the gold layer is formed on the Cr layer, because a gold layer has poor adherence with the surfaces of glass prism and is apt to peel away from the glass surface where the gold layer is coated directly on glass surface. In this case, the reflection of inputted light beam on the reflecting surfaces, however, is decreased due to the undercoated Cr layer having a reflection index of about 60%, and consequently a substantial loss of incident lights is unavoidable. This is a reason why the gold coating is unsuitable for forming the reflective surfaces γ and ε of the pentagonal prism and the expensive coating of dielectric multi layers is essential for preparation of the pentagonal prism equipped as the optical path switching element in the conventional optical path switching apparatus.

The conventional optical path switching apparatus thus constructed in the above encounters such a problem that the conventional optical path switching apparatus comprising the pentagonal prisms is produced at an expensive cost.

SUMMARY OF THE INVENTION

It is, therefore, an object of the present invention to provide a less expensive apparatus to switch optical path without using the expensive pentagonal prism as previously mentioned.

It is another object of the present invention to provide a downsized apparatus to switch optical path effectively and precisely.

In accordance with a general aspect of the optical path switching apparatus according to the present invention, there is provided an optical path switching apparatus for switching at least one input optical path selectively into at least one output optical path comprising: switching means for switching the input optical path selectively into the output optical path, the switching means having at least one switching path to permit a light beam to pass therethrough; inputting means for inputting at least one light beam to the switching means, the inputting means having the input optical path formed therein to have each of the light beams pass therethrough; outputting means for outputting at least one light beam from the switching means, the outputting means having the output optical path formed therein to have each of the light beams pass therethrough; and the switching means including (i) a housing, (ii) at least one optical path switching element accommodated in the housing to switch the input optical path selectively into any one of the output optical paths through a plurality of switching paths, the optical path switching element having a plurality of reflection surfaces including a first reflection surface to reflect the light beam inputted from each of the input optical path of the inputting means and a second reflection surface to reflect the light beam reflected from the first reflection surface to be outputted into the output optical path of the outputting means, and (iii) at least one actuation element accommodated in the housing to actuate the optical path switching element, each of the optical path switching elements being actuated and moved by the actuation element with respect to the housing, each of the actuation elements to assume two different positions including a first position in which the input optical path of the inputting means is switched to the output optical path of the outputting means and a second position in which the input optical path of the inputting means is not switched to the output optical path of the outputting means.

In accordance with a first specific aspect of the optical path switching apparatus according to the present invention, there is provided an optical path switching apparatus for switching a plurality of input optical paths selectively into any one of output optical paths, comprising: switching means for switching each of the input optical paths selectively into any one of the output optical paths, the switching means having a plurality of switching paths to permit a plurality of light beams to respectively pass therethrough; inputting means for inputting the light beams to the switching means, the inputting means having the input optical paths formed therein to have each of the light beams respectively pass therethrough; outputting means for outputting the light beams from the switching means, the outputting means having a plurality of output optical paths formed therein to have a plurality of light beams respectively pass therethrough; and the switching means including (i) a housing, (ii) a plurality of optical path switching elements accommodated in the housing to switch the input optical path into any one of the output optical paths, each of the optical path switching elements having a plurality of reflection surfaces including a first reflection surface to reflect the light beams inputted from each of the input optical paths of the inputting means and a second reflection surface to reflect the light beams reflected from the first reflection surface to be outputted into any one of the output optical paths of the outputting means, and (iii) a plurality of actuation elements accommodated in the housing to respectively actuate the optical path switching elements, each of the optical path switching elements being actuated and moved by each of the actuation elements with respect to the housing, each of the actuation elements to assume two different positions including a first position in which each of the input optical paths of the inputting means is switched to any one of the output optical paths of the outputting means and a second position in which each of the input optical paths of the inputting means is not switched to any one of the output optical paths of the outputting means.

In the first specific aspect of the optical path switching apparatus according to the present invention, the inputting means is constituted by at least one input optical fiber collimator array including a plurality of optical fibers and following input collimator lenses for converting each of inputting light beams to paralleled light beams, and the outputting means is constituted by at least one output optical fiber collimator array including a plurality of output collimator lenses and following output optical fibers for converting the light beams to paralleled outputting light beams.

In accordance with a second specific aspect of the optical path switching apparatus according to the present invention, there is provided an optical path switching apparatus for switching an input optical path selectively into any one of output optical paths, comprising: switching means for switching the input optical path selectively into any one of the output optical paths, the switching means having a switching path to permit a light beam to pass therethrough; inputting means for inputting the light beam to the switching means, the inputting means having the input optical path formed therein to have the light beam pass therethrough; outputting means for outputting the light beam from the switching means, the outputting means having the output optical paths formed therein to have the light beam pass therethrough; and the switching means including (i) a housing, (ii) a plurality of optical path switching elements accommodated in the housing to switch the input optical path into any one of the output optical paths, each of the optical path switching elements having a plurality of reflection surfaces including a first reflection surface to reflect the light beam inputted from the input optical path of the inputting means and a second reflection surface to reflect the light beam reflected from the first reflection surface to be outputted into any one of the output optical paths of the outputting means, and (iii) a plurality of actuation elements accommodated in the housing to respectively actuate the optical path switching elements, each of the optical path switching elements being actuated and moved by each of the actuation elements with respect to the housing, each of the actuation elements to assume two different positions including a first position in which the input optical path of the inputting means is switched to any one of the output optical paths of the outputting means and a second position in which the input optical path of the inputting means is not switched to any one of the output optical paths of the outputting means.

In the second specific aspect of the optical path switching apparatus according to the present invention, the inputting means is constituted by an input optical fiber collimator array including an optical fiber and a following input collimator lens for converting an inputting light beam to a paralleled light beam, and the outputting means is constituted by at least one output optical fiber collimator array including a plurality of output collimator lenses and a plurality of following output optical fibers for converting the light beam to a paralleled outputting light beam.

In accordance with a third specific aspect of the optical path switching apparatus according to the present invention, there is provided an optical path switching apparatus for switching each of input optical paths selectively into an output optical path, comprising: switching means for switching each of the input optical paths selectively into the output optical path, the switching means having a switching path to permit a light beam to pass therethrough; inputting means for inputting the light beams to the switching means, the inputting means having a plurality of the input optical paths formed therein to have the light beam pass therethrough; outputting means for outputting the light beam from the switching means, the outputting means having an output optical path formed therein to have the light beam pass therethrough; and the switching means including (i) a housing, (ii) a plurality of optical path switching elements accommodated in the housing, each of the optical path switching elements having a plurality of reflection surfaces including a first reflection surface to reflect the light beams inputted from any one of the input optical path of the inputting means and a second reflection surface to reflect the light beam reflected from the first reflection surface to be outputted into the output optical path of the outputting means and to form a reflection space defined between the first and second reflection surfaces, and (iii) a plurality of actuation elements accommodated in the housing to respectively actuate the optical path switching elements any each of the optical path switching elements being actuated and moved by each of the actuation elements with respect to the housing, each of the actuation elements to assume two different positions including a first position in which the input optical path of the inputting means is switched to any one of the output optical paths of the outputting means and a second position in which the input optical paths of the inputting means is not switched to any one of the output optical paths of the outputting means.

In the third specific aspect of the optical path switching apparatus according to the present invention, the inputting means is constituted by at least one input optical fiber collimator array including a plurality of optical fibers and a plurality of following input collimator lenses for converting an inputted light beam to a paralleled light beam, and the outputting means is constituted by an optical fiber collimators including a fiber collimator lens respectively and a following output optical fiber for converting the light beam to a paralleled outputted light beams.

In any aspect of the present invention described above, each of the first and second reflection surfaces of the optical path switching element preferably are angled with respect to each other at an angle of about 45 degrees to form a reflection space allowing the light beam to pass from the first reflection surface to the second reflection surface while the light beam from the input optical path to the first reflection surface is passed from the second reflection surface to the output optical path. The first and second reflection surfaces of the optical path switching elements may be formed respectively by first and second flat mirrors securely mounted on the surfaces of the optical path switching element. Bodies of the optical path switching elements may be prepared by a process of machining and polishing or a process of molding. The inputting means and outputting means can be disposed to have each of the input optical paths and each of the output optical paths be directed in perpendicular or parallel relationship with each other.

BRIEF DESCRIPTION OF THE DRAWINGS

The present invention and many of the advantages thereof will be better understood from the following detailed description when considered in connection with the accompanying drawings, wherein:

FIG. 6B is a plan view of a third embodiment of the optical path switching apparatus according to the present invention;

DESCRIPTION OF THE PREFERRED EMBODIMENTS

Some of the preferred embodiments of the optical path switching apparatus according to the present invention will now be described in detail in accordance with accompanying drawings.

Figure 1:
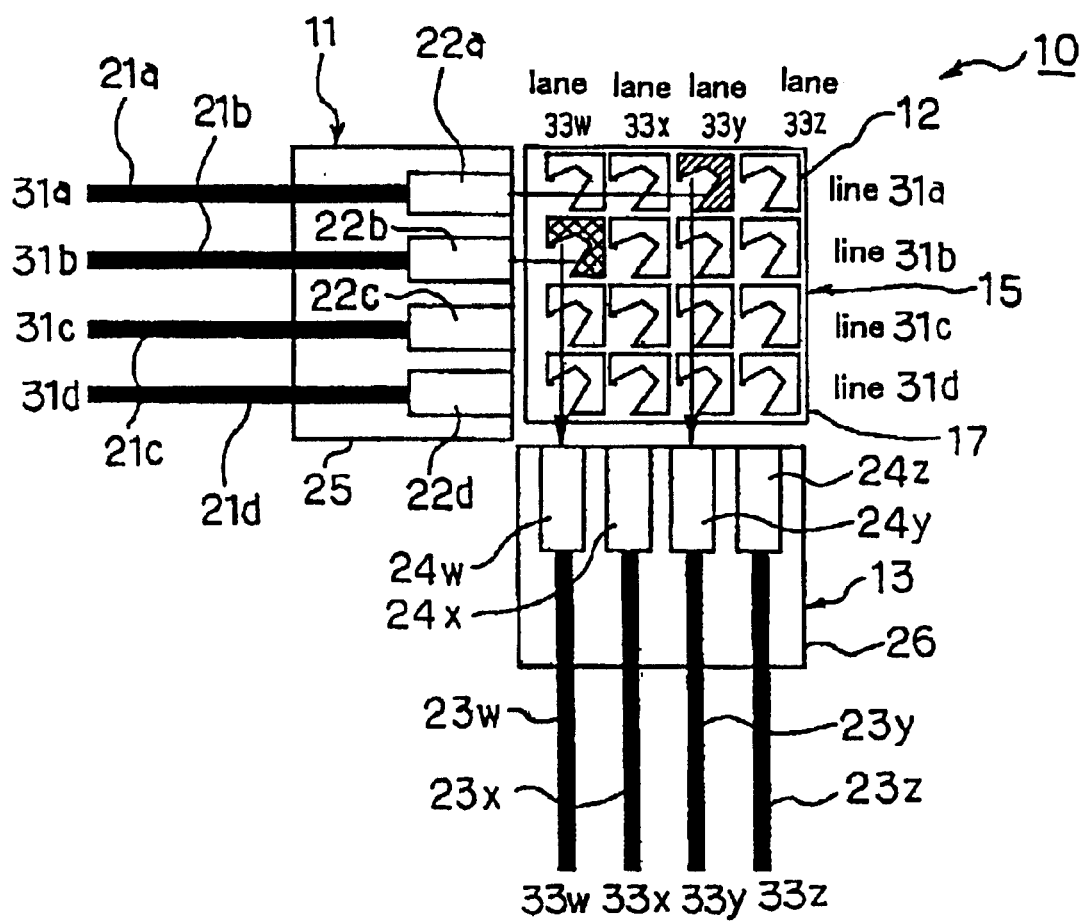
FIG. 1 is a plan view of a first embodiment of the optical path switching apparatus according to the present invention.
Figure 2:
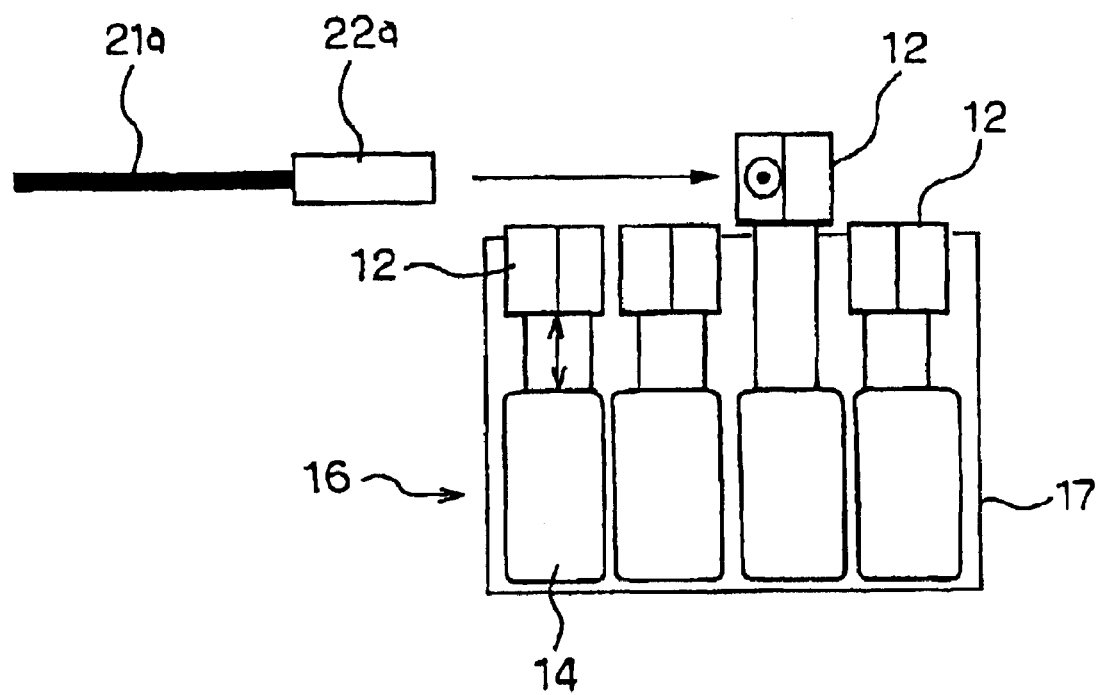
FIG. 2 is a side view of an accumulation elements array forming part of the optical path switching apparatus shown in FIG. 1.

Referring to FIGS. 1 and 2 of the drawings, there is shown one of the first embodiment of the optical path switching apparatus according to the present invention. The optical path switching apparatus 10 comprises switching means 15 for switching respectively each of input optical paths to any one of output optical paths, an inputting means 11 for inputting the light beams to the switching means 15 and an outputting means 13 for outputting the light beams from the switching means 15. The switching means 15 has a plurality of switching paths to permit a plurality of light beams to respectively pass therethrough. The inputting means 11 has four input optical paths formed therein to have the light beams respectively pass therethrough. The outputting means 13 has four output optical paths formed therein to have a plurality of light beams respectively pass therethrough.

The light inputting means 11 is constituted by an optical fiber collimator array which is equipped with optical fibers 21a, 21b, 21c and 21d, which are extended from inputting light ports 31a, 31b, 31c and 31d, and following collimator lenses 22a, 22b, 22c and 22d. The optical fibers 21a, 21b, 21c and 21d are optically connected with the corresponding collimator lens 22a, 22b, 22c and 22d, respectively. All of the collimator lenses 22a, 22b, 22c and 22d are fixed on an optical fiber collimator array substrate 25. The optical fiber collimator array substrate 25, preferably, has one or more positioning guide means to adjust positions of the optical fibers and collimator lenses.

The light outputting means 13 is constituted by an optical fiber collimator array which is equipped with collimator lenses 24w, 24x, 24y, 24z and following optical fibers 23w, 23x, 23y, 23z. Each of the collimator lenses 24w, 23x, 24y, 24z is optically connected to each of the following optical fibers 23w, 23x, 23y, 23z, respectively to convey light beams into outputting light ports 33w, 33x, 33y, 33z. All of the collimator lenses 24w, 24x, 24y, 24z are fixed on an optical fiber collimator array substrate 26. The optical fiber collimator array substrate 26 optionally has one or more positioning guide means to adjust positions of optical fibers and collimator lenses.

Each of the collimator lenses 22a, 22b, 22c, 22d, 24w, 24x, 24y and 24z arranged in the inputting or outputting means is able to be any type of lens having appropriate lens functions, such as a spherical lens, a drum-type lens or a GRIN lens capable to vary reflection index locally. Each of the optical fiber collimator array substrate 25 of inputting means 11 and the optical fiber collimator array substrate 26 of outputting means 13 may be made of ceramics, glass or metal.

The optical path switching means 15 has a plurality of switching paths to permit a plurality of light beams respectively pass thereon and is placed at the intersection of the input optical path and the output optical path. The optical path switching means 15 is constructed by a housing 17, a plurality of optical path switching elements 12 accommodated in the housing 17 and a plurality of actuation elements 14 arranged on an actuation elements array 16 to actuate and move the optical path switching elements 12.

Figure 3:
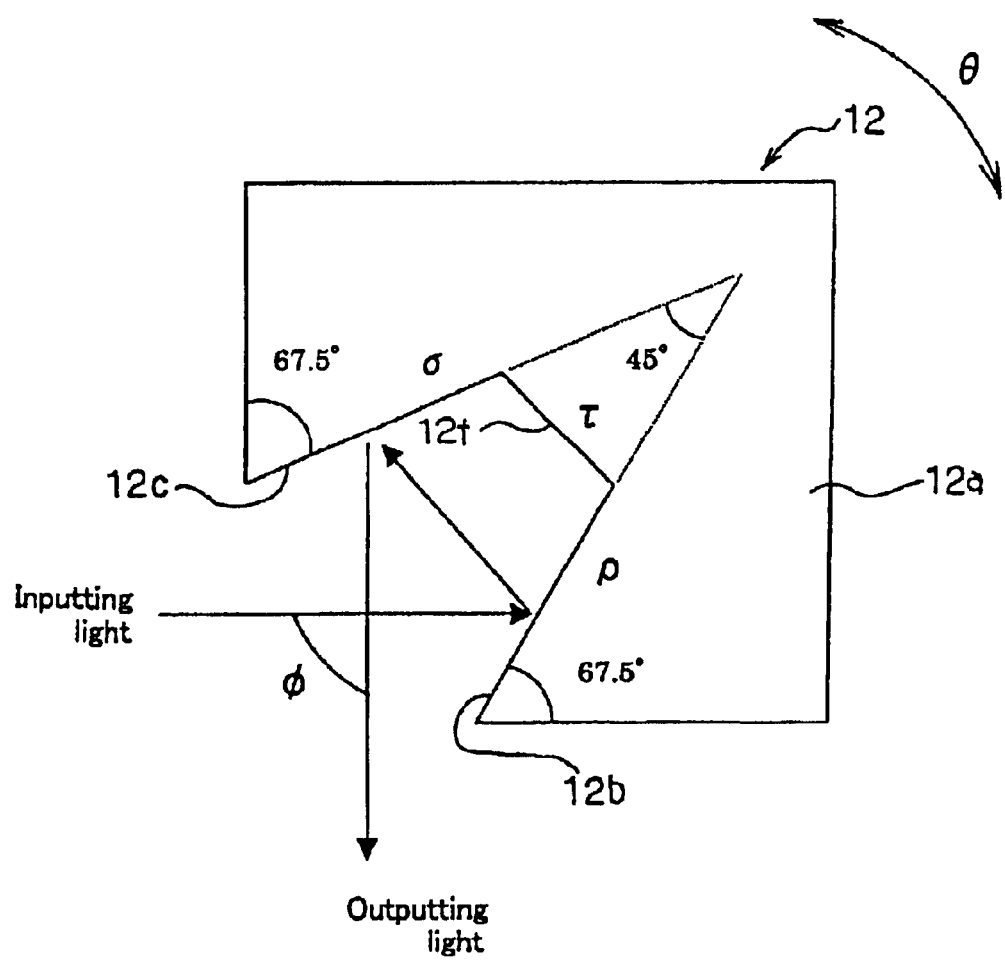
FIG. 3 is a plan view of an optical path switching element forming part of the optical path switching apparatus shown in FIG. 1.
Figure 4:
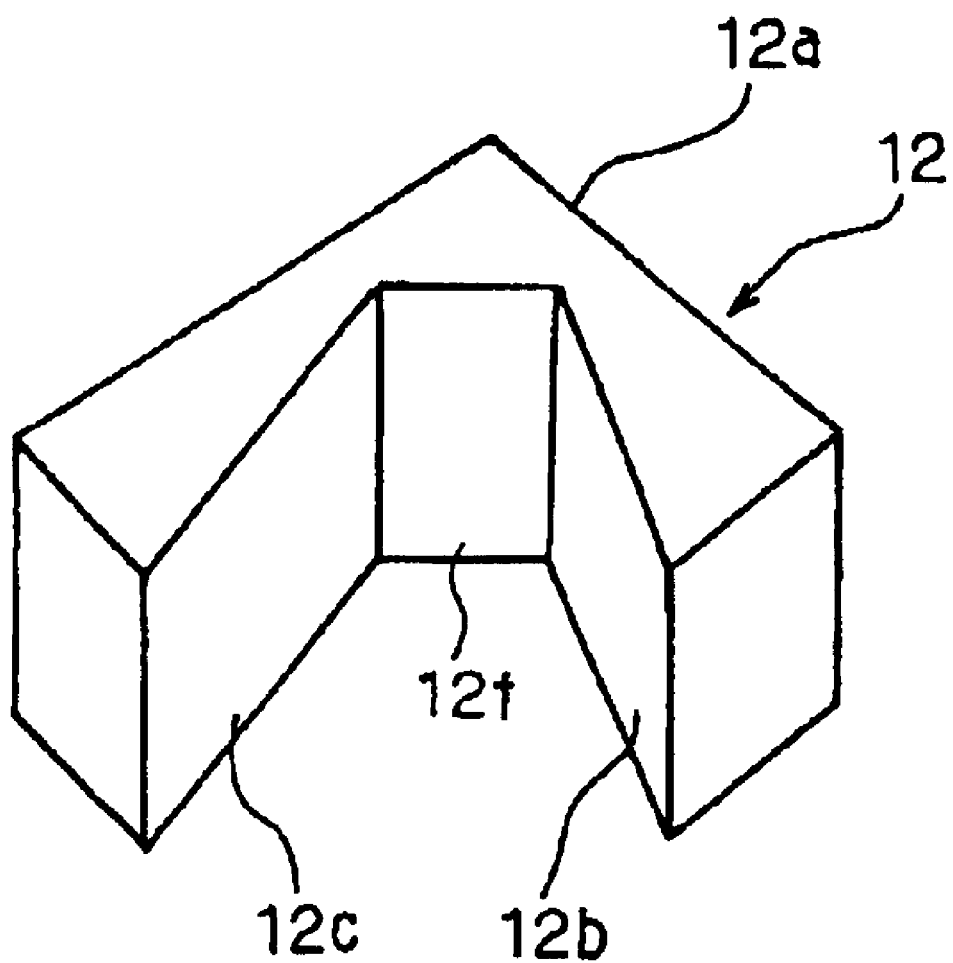
FIG. 4 and FIG. 5 are oblique perspective figures of the optical path switching elements forming part of the switching means of the optical path switching apparatus according to the present invention.

As shown in FIGS. 3 and 4, each of optical path switching elements 12 has a pair of reflection surfaces 12b and 12c and a reflection space defined between the reflection surfaces 12b and 12c, which are formed on the optical path switching element 12.

The reflection surfaces 12b and 12c, preferably, are flat surfaces coated with a reflective layer such as dielectric multi layers composed of $SiO_2$ and $TiO_2$, that are used as usual materials for manufacturing parts of optical communications devices. The reflection surfaces may be also made of a pair of flat mirrors 12e and 12d, which respectively are mounted securely on the optical path switching element 12.

The optical path switching element 12 has a structure in which the reflection surface 12b (plain ρ) and the reflection surface 12c (plain σ) are formed so that the both surfaces are directed at an angle of 45 degrees with respect to each other, as shown in FIG. 3. Since the surface τ is not involved in any light reflection, the shape, material or situation of the surface τ is not limited. The optical path switching element 12 carries out functions as same as the functions of a pentagonal prism of the conventional light switching apparatus and therefore the angle φ in the optical path switching element 12 defined by the input optical path and the output optical path is maintained constantly at 90 degrees. Namely, the angle φ is kept at 90 degree any time, even if the setting-up angle θ of the optical path switching element 12 is eventually altered.

The reflection space is formed in each of the optical path switching elements 12. The reflection space has first and second side faces respectively defined by the first reflection surface 12b and the second reflection surfaces 12c, top end of which is open toward the outside of the optical path switching element 12, and the bottom end of which is defined between the first and second reflection surfaces 12b and 12c in opposing and spaced relationship with the top end. The reflection space is diverged from the bottom end to the space top end. Therefore, the reflection space is in the form of a trapezoidal shape in cross section taken along the plane in parallel relationship with the attaching surface of the optical path switching elements 12 and the space top end is larger than the space bottom end, as seen from FIGS. 4 and 5. A cross section of the reflection space, however, may be a triangle or the other shape in so far as the first and second flat reflection surfaces 12b, 12c are placed as described above. The third surface 12f (plain τ) can be formed between the first and second reflection surfaces 12b and 12c to adjoin the two reflection surfaces 12b and 12c. Bottom end of the reflection space is defined by the third surface 12f. As the third surface 12f is independent from reflections of light beams, reflective coating is not necessary on the surface. The third surface 12f may be a flat or concavely curved wall.

A body of the optical path switching element 12, called herein as 'switching element body 12a', may be manufactured by a machining and polishing method from glass, metal such as stainless steel and carbon steel, plastics or the other materials. For example, the optical path switching element 12 having the two reflection surfaces 12b and 12c may be formed by cutting, grinding and polishing of a glass block. Specifically, a glass block of cubic solids is cut by a blade having a cutting angle of 45 degrees or is cut twice by a very thin blade to shape a reentrant such as a figuration of the switching element body 12a in FIG. 4. The two reflection surfaces 12b and 12c are formed in the switching element body 12a to face each other and have a crossing angle of 45 degrees as indicated in FIG. 3. The first and second reflection surfaces 12b and 12c prepared by a method described above are preferably further polished using an abrasive sheet of number 2000 or more to enhance the reflection effect thereof, if necessary. Thereafter, a reflective coating of dielectric multi layers composed of $TiO_2$ and $SiO_2$ is optionally applied on the surfaces. As a substitution for coating of the dielectric multi layers, it is possible to apply coating of a metal layer having high reflection property such as gold or silver layer by vapor deposition method, spattering method or metal plating method. In order to increase an adherence of the reflective metal layer with surfaces of the switching element body 12a, undercoating of metal such as Cr may be applied, if necessary. In this case, since incident light beams are reflected on the reflective metal layers of reflection surfaces, reflection index at the reflection surfaces is not influenced by the undercoated layer.

Figure 5:
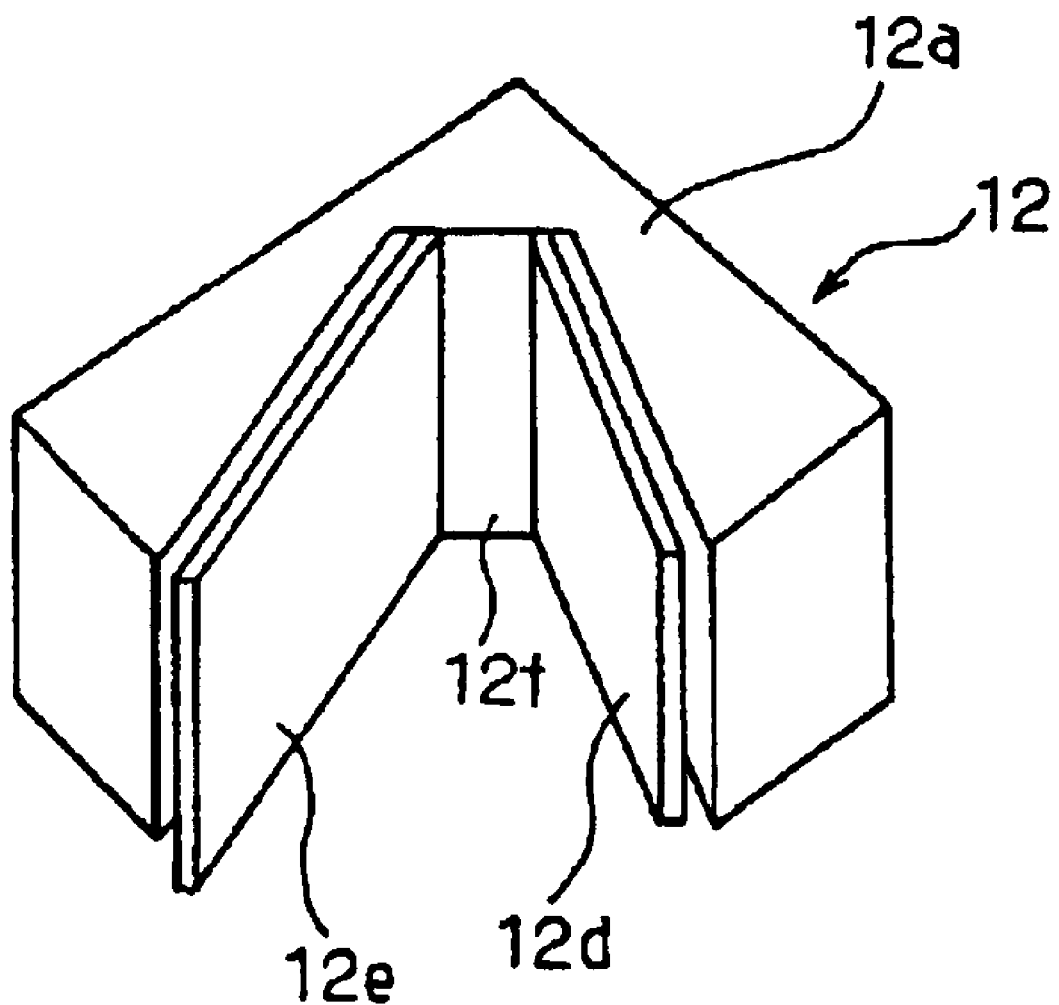

Both of the first and second reflection surfaces 12b, 12c of the optical path switching element 12 are preferably coated with a reflective layer such as dielectric multi layers. In the optical path switching element 12, however, a pair of flat mirrors 12d and 12e may be mounted on the surfaces of the optical path switching element 12, as illustrated in FIG. 5, in stead of applying reflective coatings. The flat mirrors 12d and 12e may be composed of glass sheet, metal sheet, or plastic film. A reflective coating can be applied on the mirrors additionally. In any case, it is preferable that the both of first and second reflection surfaces 12b, 12c have effective and precise reflection property of the inputted light beams.

The switching element body 12a can be made by molding, too. For example, a metal is molded by die-cast molding, metal-injection molding or press molding to form a switching element body 12a. A plastic or glass can be shaped also by molding to form the switching element body 12a. Each of the optical path switching elements 12 having the reflection surfaces 12b and 12c and a reflection space therein has also an attaching surface to attach securely to the housing 17 by corresponding actuation elements 14, respectively.

Each optical path switching element 12 is selectively actuated and moved by the corresponding actuation element 14, so that each of the optical path switching elements 12 takes either of two deferent positions, i.e., the first position where a light beam arrives in the optical path switching element 12 to switch the input optical paths into any one of output optical paths or the second position where any light beam do not arrive in the optical path switching element 12 not to switch optical paths. In other word, each of the optical path switching elements 12 takes respectively a position capable to connect optically an input optical path with an output optical path or another position incapable to do so by movement of actuation elements 14. Each of the optical path switching elements 12 may be moved vertically or horizontally by actuation elements 14.

The optical path switching elements 12 and actuation element array 16 are accommodated in a housing 17 and the constitutive parts make up a switching means 15 of the optical path switching apparatus 10, as a whole. The housing 17 is preferably made of metal and prepared by die-cast molding, metal-injection molding, or press molding.

The inputting means 11 and the outputting means 13 may be positioned to have each of input optical paths and each of output optical paths direct in perpendicular relationship with respect to each other as shown in FIG. 1. In this embodiment, direction of each incident light beam is respectively altered at right angles by each of the optical path switching elements which is positioned at cross point of the input optical path and the output optical path. As a modification of the embodiment shown in FIG. 1, the inputting means 11 and the outputting means 13 optical path may be disposed so as to have each of input optical paths and each of output optical paths direct in parallel relationship each other. In this modified embodiment, a pair of optical path switching elements 12 are arranged for one light switching path and the direction of each inputted light beam is altered twice at an angle of 90 degrees on each one of the optical path switching element 12 respectively and conveyed toward output optical paths oriented to the reverse direction of the input optical path.

The first embodiment of the optical path switching apparatus 10 according to the present invention, as described in the above, comprises switching means 15 for switching each of input optical paths selectively into any one of the output optical paths, the switching means 15 having a plurality of switching paths to permit a plurality of light beams to respectively pass therethrough, inputting means 11 for inputting the light beams to the switching means 15, the inputting means 11 having the input optical paths formed therein to have the light beams respectively pass therethrough, outputting means 13 for outputting the light beams from the switching means 15, the outputting means 13 having a plurality of output optical paths formed therein to have a plurality of light beams respectively pass therethrough, and the switching means including (i) a housing 17, (ii) a plurality of optical path switching elements 12 accommodated in the housing 17 to switch the input optical path into any one of the output optical paths, each of the optical path switching elements 12 having a plurality of reflection surfaces 12b, 12c including a first reflection surface 12b to reflect the light beams inputted from each of the input optical paths of the inputting means 11 and a second reflection surface 12c to reflect the light beams reflected from the first reflection surface 12b to be outputted into any one of the output optical paths of the outputting means 13, and (iii) a plurality of actuation elements 12 accommodated in the housing 17 to respectively actuate the optical path switching elements, each of the optical path switching elements 12 being actuated and moved by each of the actuation elements 12 with respect to the housing 17, each of the actuation elements to assume two different positions including a first position in which each of the input optical paths of the inputting means 11 is switched to any one of the output optical paths of the outputting means 13 and a second position in which each of the input optical paths of the inputting means 11 is not switched to any one of the output optical paths of the outputting means 13.

In the optical path switching apparatus 10 having an inputting means 11 made of four input optical paths from light ports 31a, 31b, 31c and 31d, and an outputting means 13 made of four output optical paths from light ports 33w, 33x, 33y and 33z, sixteen optical path switching elements 12 are respectively positioned at respective cross points of 'line 31a', 'line 31b', 'line 31c' and 'line 31d' with 'lane 33w', 'lane 33x, 'lane 33y' and 'lane 33z'. When one of the optical path switching elements 12 existing at the cross point of 'line 31a' with 'lane 33y', which is hatched in FIG. 1, is actuated and moved by the corresponding actuation element 14 into a position to accept a light beam from inputting means 11 having an optical fiber 21a and a collimator lens 22a, the inputted light beam is deflected at right angles by the actuated optical path switching element 12 into the output optical path of the outputting means 13 having a collimator lens 24y and a following optical fiber 23y. Consequently, the optical path from the light inputting light port 31a is optically joined and connected with the optical path to the outputting port 33y. As same as the above, the optical path from the inputting port 31b are interconnected with an optical path to the outputting light port 33w, when an optical path switching element 12 at the cross point of the line 31b with the lane 33w, which is cross-hatched in FIG. 1, is actuated and moved by the corresponding actuation element 14 into the position to receive a light beam from inputting means 11.

According to the optical path switching apparatus 10 described above, it is possible to interconnect selectively an optical path from any one of the inputting light ports 31a, 31b, 31c and 31d with any one of the outputting light ports 33w, 33x, 33y and 33z. Of course, it is possible to switch simultaneously multiple optical paths by this optical path switching apparatus 10. For example, each of the optical paths from the inputting light port 31a and the outputting light port 31b may be switched respectively into each of optical paths into the inputting light port 33y and the outputting light port 33w at same time.

From the above detailed description, it will be understood that the optical path switching apparatus 10 comprising the optical path switching elements 12 simple in construction does not need the pentagonal prism.

Figure 6A:
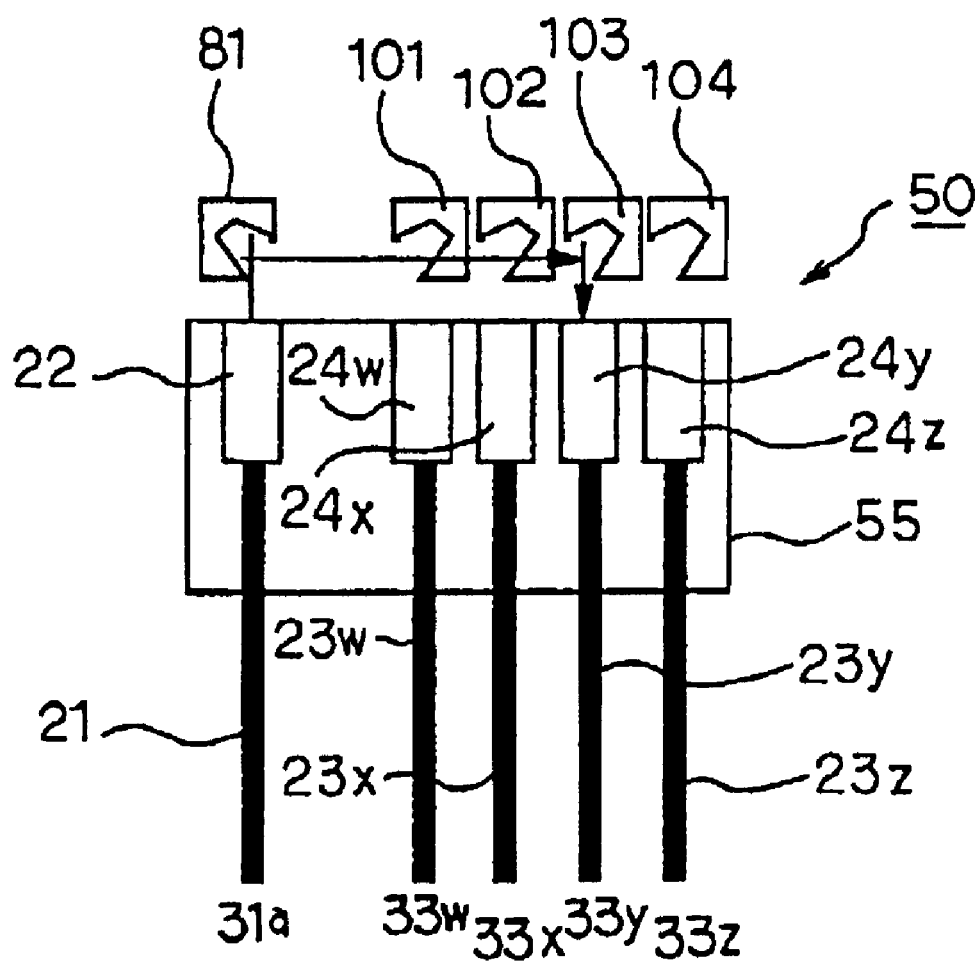
FIG. 6A is a plan view of a second embodiment of the optical path switching apparatus according to the present invention.
Figure 7:
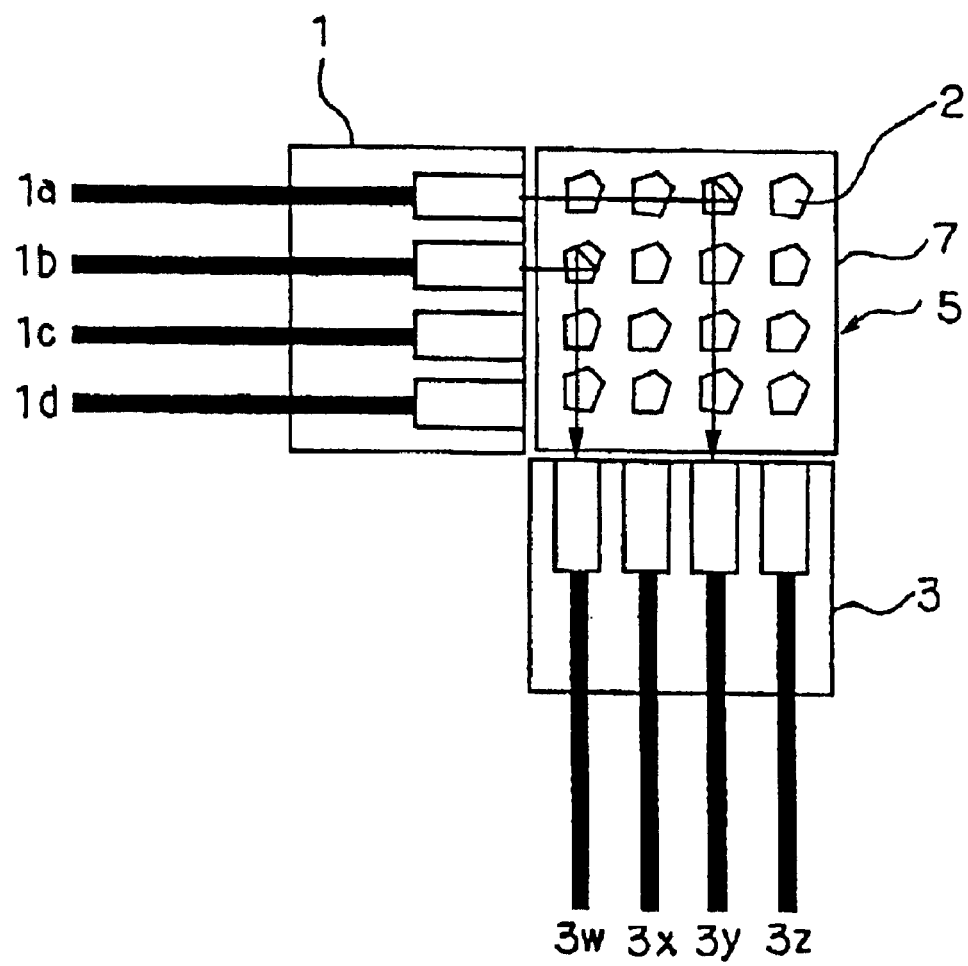
FIG. 7 is a plan view of the conventional optical path switching apparatus.
Figure 8:
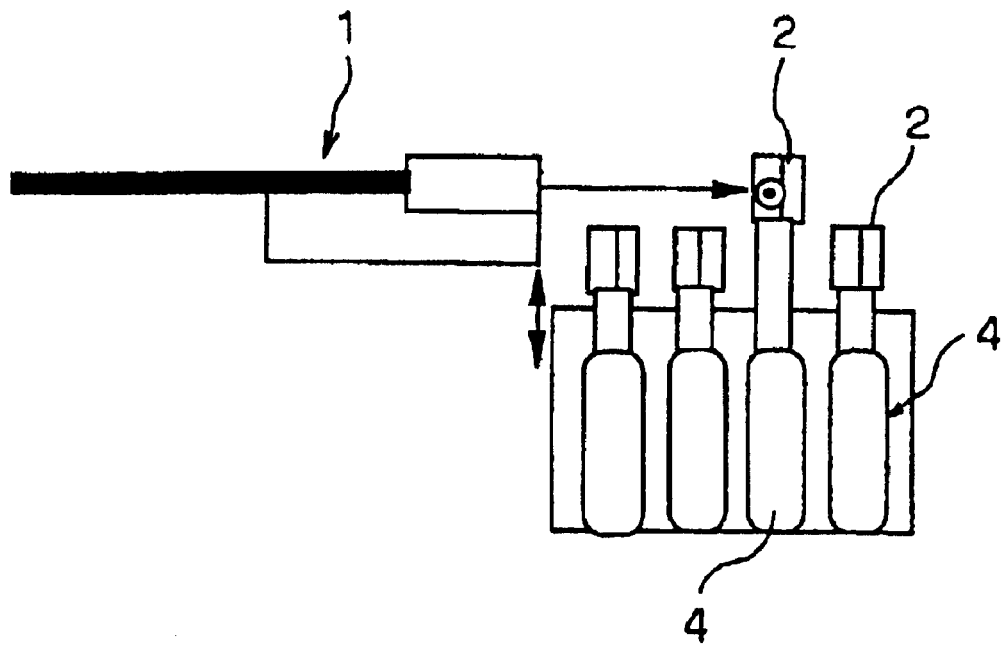
FIG. 8 is a side view of the conventional optical path switching apparatus shown in FIG.7.
Figure 9:
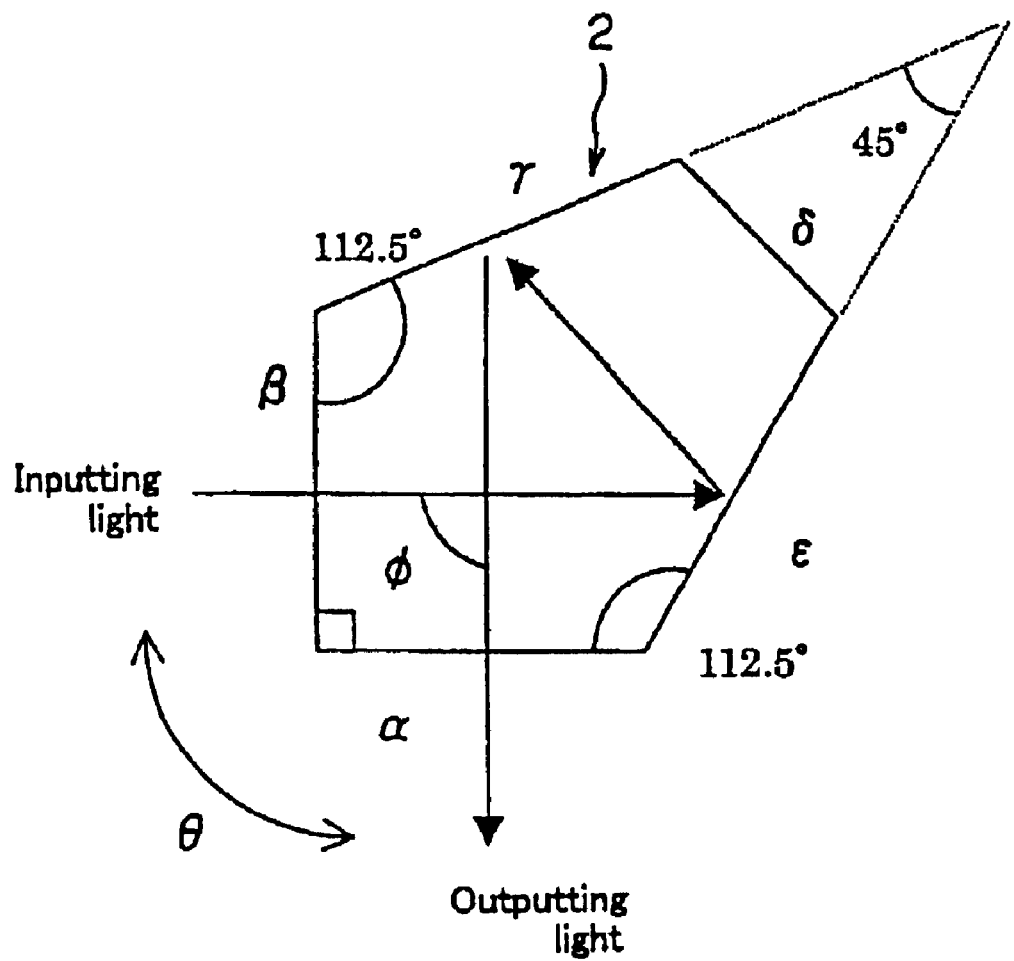
FIG. 9 is a plan view of the pentagonal prism forming part of the conventional optical path switching apparatus.
Figure 10:
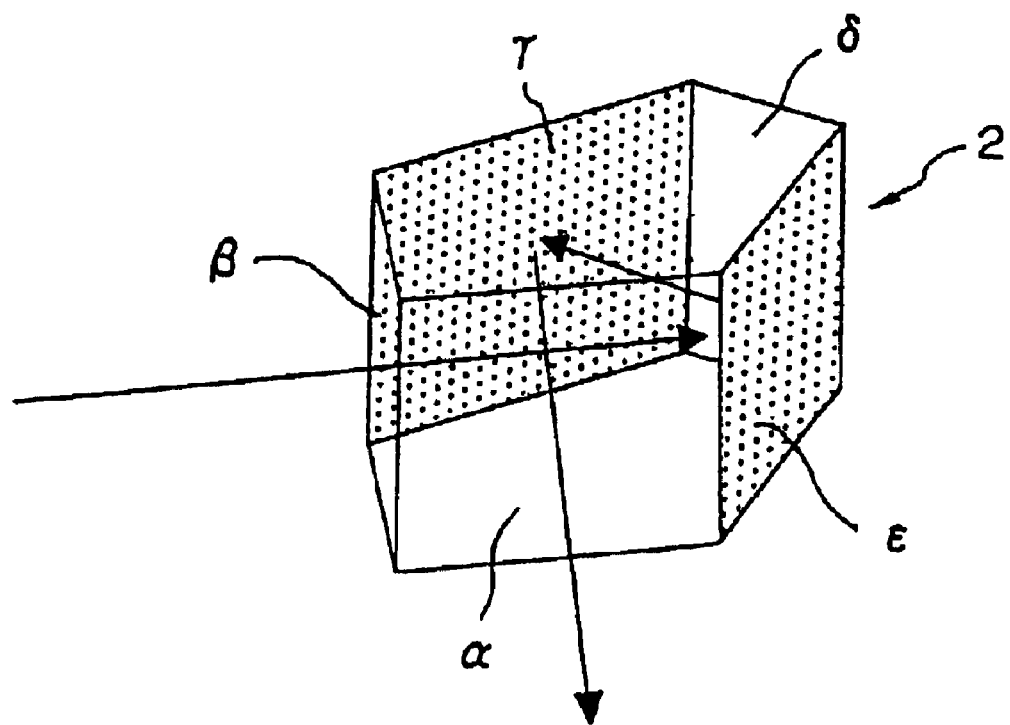
FIG. 10 is an oblique perspective figure of the pentagonal prism.

Referring to FIG. 6A of the drawing, there is shown one of the other embodiments of the optical path switching apparatus according to the present invention.

As second embodiment of the present invention, there is provided an optical path switching apparatus 50 having one input optical path and a plurality of output optical paths and the both optical paths are directed in parallel with each other, as shown in FIG. 6A. The optical path switching apparatus 50 of FIG. 6A has an input optical path from an inputting light port 31a of inputting means 11 and output optical paths to outputting light ports 33w, 33x, 33y and 33z of outputting means 13 disposed in paralleled with each other. The inputting means 11 comprises an input optical fiber 21 and a following input collimator lens 22, and outputting means 13 comprises four output collimator lenses 24w, 24x, 24y and 24z, and optically connected with following output optical fibers 23w, 23x, 23y and 23z. All of them are arranged on a common substrate 55, on which all of the optical fibers and collimator lenses are directed in parallel relation with each other. The optical path switching apparatus 50 has first optical path switching element 81 and second optical path switching elements 101, 102,103 and 104 each of which is equipped in switching means 15 and respectively actuated by corresponding actuation elements 14.

In this optical path switching apparatus 50, an inputting light beam from an inputting light port 31a is introduced trough the optical fiber 21 and the collimator lens 22 into the first optical path switching element 81 where the introduced light beam is reflected at right angles toward the second optical path switching element 103 actuated into a position to meet the optical path. The light beam is reflected again at right angles in the second optical path switching element 103 actuated into a position to meet the optical path and then enters into an output optical path directed in parallel relation with respect to the input optical path. The light beam proceeds on the outputting light path toward the outputting light port 33y. Thus, the optical path from the inputting light port 31a is optically connected with the optical path to the outputting light port 33y and consequently the light beam of the inputting light port 31a is selectively transmitted to the light port 33y through the optical path switching apparatus according to the present invention. In the embodiment shown in FIG. 6A, the optical path switching elements 101, 102 and 104 are not actuated and they do not participate in switching of any optical path at the above moment.

With regard to the embodiment shown in FIG. 6A, the inputting means and outputting means can be exchanged so that the optical path switching apparatus 50 has an input optical path in inputting means and a plurality of output optical paths in outputting means. In other words, a direction of light beam passing through the optical switching apparatus 50 may be reversible.

The second embodiment of the optical path switching apparatus 50 according to the present invention, as described in the above, comprises switching means 15 for switching an input optical path selectively into any one of the output optical paths, the switching means 15 having a switching path to permit a light beam to pass therethrough, inputting means 11 for inputting the light beam to the switching means, the inputting means 11 having the input optical path formed therein to have the light beam pass therethrough, outputting means 13 for outputting the light beam from the switching means, the outputting means 13 having the output optical paths formed therein to have the light beam pass therethrough; and the switching means including (i) a housing 17 (ii) a plurality of optical path switching elements 81, 101, 102, 103, 104 accommodated in the housing 17 to switch the input optical path into any one of the output optical paths, each of the optical path switching elements 81, 101, 102, 103, 104 having a plurality of reflection surfaces including a first reflection surface to reflect the light beam inputted from the input optical path of the inputting means 11 and a second reflection surface to reflect the light beam reflected from the first reflection surface to be outputted into any one of the output optical paths of the outputting means 13, and (iii) a plurality of actuation elements 14 accommodated in the housing 17 to respectively actuate the optical path switching elements 81, 101, 102, 103, 104, each of the optical path switching elements 81, 101, 102, 103, 104 being actuated and moved by each of the actuation elements 14 with respect to the housing 17, each of the actuation elements 14 to assume two different positions including a first position in which the input optical path of the inputting means is switched to any one of the output optical paths of the outputting means 13 and a second position in which the input optical path of the inputting means 11 is not switched to any one of the output optical paths of the outputting means 13.

From the above detailed description, it will be understood that the optical path switching apparatus 50 comprising the optical path switching elements simple in construction does not need the pentagonal prism.

In addition to the above, the second embodiment of the optical path switching apparatus 50 disclosed in FIG. 6A has particular advantages that a layout of optical fibers in or around the optical path switching apparatus becomes simple and compact because all of the inputting and outputting light ports 31, 33y, 33x and 33z are able to be positioned at same side of the switching apparatus and all of optical fibers can be arranged in parallel each other.

Referring to FIG. 6B of the drawing, there is shown the third embodiment of the optical path switching apparatus according to the present invention.

The third embodiment of the optical path switching apparatus 60 according to the present invention may be provided. The optical path switching apparatus 60 has plural input optical paths in inputting means 11 and an output optical path in outputting means 13 as shown in FIG. 6B. In this optical path switching apparatus 60, there are inputting means 11 made of optical fibers 21a, 21b, 21c and 21d followed by collimator lenses 22a, 22b, 22c, 22d arranged on an input optical fibers array substrate 25, a plurality of optical path switching elements 12 equipped in switching means 15 actuated by actuation elements and an outputting means 13 made of collimator lenses 24 and following optical fibers 23, both of which arranged on output optical fibers array substrate 26.

In this embodiment, a light beam is introduced into this switching apparatus 60 through any one of the input optical paths of the inputting means 11 through the optical fibers 21a, 21b, 21c or 21d and the following collimator lenses 22a, 22b, 22c, or 22d. The optical path of the inputted light beam is switched at one of the optical path switching elements 12 equipped in switching means 15 toward an output optical path of the outputting means 13. The input optical paths from inputting means 11 and an output optical path of outputting means 13 are directed in perpendicular with each other as shown in FIG. 6B, since each of the inputted light beams is reflected at right angles at one of the optical path switching elements 12 toward the output optical path of out putting means 13 in the optical path switching apparatus 60.

The third embodiment of the optical path switching apparatus 60 according to the present invention, as described in the above, comprises switching means 15 for switching each of the input optical paths selectively into the output optical path, the switching means 15 having a switching path to permit a light beam to pass therethrough, inputting means 11 for inputting the light beams to the switching means, the inputting means 11 having the input optical paths formed therein to have the light beam pass therethrough, outputting means 13 for outputting the light beam from the switching means 15, the outputting means 13 having the output optical path formed therein to have the light beam pass therethrough; and the switching means 15 including (i) a housing 17, (ii) a plurality of optical path switching elements 12 accommodated in the housing 17 to switch the input optical path into any one of the output optical paths, each of the optical path switching elements 12 having a plurality of reflection surfaces including a first reflection surface 12b to reflect the light beams inputted from any one of the input optical path of the inputting means 11 and a second reflection surface 12c to reflect the light beam reflected from the first reflection surface 12b to be outputted into the output optical path of the outputting means 13, and (iii) a plurality of actuation elements 12 accommodated in the housing 17 to respectively actuate the optical path switching elements 12 any each of the optical path switching elements being actuated and moved by each of the actuation elements 14 with respect to the housing 17, each of the actuation elements to assume two different positions including a first position in which the input optical path of the inputting means 11 is switched to any one of the output optical paths of the outputting means 13 and a second position in which the input optical paths of the inputting means 11 is not switched to any one of the output optical paths of the outputting means 13.

From the above detailed description, it will be understood that the optical path switching apparatus 60 comprising the optical path switching element 12 simple in construction does not need the pentagonal prism.

As described hereinbefore, the optical path switching apparatus according to the present invention comprising the optical path switching elements simple in construction does not need any expensive pentagonal prism. This makes it possible for the optical path switching apparatus according to the present invention to be produced at a less expensive cost.

While the subject invention has been described with relation to the preferred embodiments, various modifications and adaptations thereof will now be apparent to those skilled in the art as far as such modifications and adaptations fall within the scope of the appended claims intended to be covered thereby.

What is claimed is:

1. An optical path switching apparatus for switching at least one input optical path selectively into at least one output optical path, comprising:

switching means for switching said input optical path selectively into said output optical path, said switching means having at least one switching path to permit a light beam to pass therethrough;

inputting means for inputting at least one light beam to said switching means, said inputting means having said input optical path formed therein to have each of said light beams pass therethrough;

outputting means for outputting at least one light beam from said switching means, said outputting means having said output optical path formed therein to have each of said light beams pass therethrough; and said switching means including (i) a housing, (ii) at least one optical path switching element accommodated in said housing to switch said input optical path selectively into any one of said output optical path through a plurality of switching paths, said optical path switching element having a plurality of reflection surfaces including a first reflection surface to reflect said light beam inputted from each of said input optical path of said inputting means and a second reflection surface to reflect said light beam reflected from said first reflection surface to be outputted into said output optical path of said outputting means, wherein said first and second reflection surfaces of said optical path switching elements are formed respectively by first and second flat mirrors securely mounted on surfaces of said optical path switching element, and (iii) at least one actuation element accommodated in said housing to actuate said optical path switching element, each of said optical path switching element being actuated and moved by said actuation element with respect to said housing, each of said actuation element to assume two different positions including a first position in which said input optical path of said inputting means is switched to said output optical path of said outputting means and a second position in which said input optical path of said inputting means is not switched to said output optical path of said outputting means.

2. An optical path switching apparatus as set forth in claim 1, in which each of said first and second reflection surfaces of said optical path switching element are angled with respect to each other at an angle of about 45 degrees to form a reflection space allowing said light beam to pass from said first reflection surface to said second reflection surface while said light beam from said input optical path to said first reflection surface is passed from said second reflection surface to said output optical path.

3. An optical path switching apparatus as set forth in claim 1, in which said inputting means and outputting means are disposed to have each of said input optical paths and each of said output optical paths be directed in perpendicular relationship with each other, respectively.

4. An optical path switching apparatus as set forth in claim 1, in which said inputting means and said outputting means are disposed to have each of said input optical paths and each of said output optical paths be directed in parallel relationship with respect to each other.

5. An optical path switching apparatus for switching a plurality of input optical paths selectively into any one of output optical paths, comprising:

switching means for switching each of said input optical paths selectively into any one of said output optical paths, said switching means having a plurality of switching paths to permit a plurality of light beams to respectively pass therethrough;

inputting means for inputting said light beams to said switching means, said inputting means having said input optical paths formed therein to have said light beams respectively pass therethrough;

outputting means for outputting said light beams from said switching means, said outputting means having a plurality of output optical paths formed therein to have a plurality of light beams respectively pass therethrough; and said switching means including (i) a housing, (ii) a plurality of optical path switching elements accommodated in said housing to switch said input optical path into any one of said output optical paths, each of said optical path switching elements having a plurality of reflection surfaces including a first reflection surface to reflect said light beams inputted from each of said input optical paths of said inputting means and a second reflection surface to reflect said light beams reflected from said first reflection surface to be outputted into any one of said output optical paths of said outputting means, wherein said first and second reflection surfaces of said optical path switching elements are formed respectively by first and second flat mirrors securely mounted on surfaces of said optical path switching element, and (iii) a plurality of actuation elements accommodated in said housing to respectively actuate said optical path switching elements, each of said optical path switching elements being actuated and moved by each of said actuation elements with respect to said housing, each of said actuation elements to assume two different positions including a first position in which each of said input optical paths of said inputting means is switched to any one of said output optical paths of said outputting means and a second position in which each of said input optical paths of said inputting means is not switched to any one of said output optical paths of said outputting means.

6. An optical path switching apparatus as set forth in claim 7, in which each of said first and second reflection surfaces of said optical path switching element are angled with respect to each other at an angle of about 45 degrees to form a reflection space allowing said light beam to pass from said first reflection surface to said second reflection surface while said light beam from said input optical path to said first reflection surface is passed from said second reflection surface to any one of said output optical paths.

7. An optical path switching apparatus as set forth in claim 5, in which said inputting means and outputting means are disposed to have each of said input optical paths and each of said output optical paths be directed in perpendicular relationship with each other, respectively.

8. An optical path switching apparatus as set forth in claim 5, in which said inputting means and outputting means are disposed to have each of said input optical paths and each of said output optical paths be directed in parallel relationship with respect to each other.

9. An optical path switching apparatus for switching an input optical path selectively into any one of output optical paths, comprising:

switching means for switching said input optical path selectively into any one of said output optical paths, said switching means having a switching path to permit a light beam to pass therethrough;

inputting means for inputting said light beam to said switching means, said inputting means having said input optical path formed therein to have said light beam pass therethrough;

outputting means for outputting said light beam from said switching means, said outputting means having said output optical paths formed therein to have said light beam pass therethrough; and said switching means including (i) a housing, (ii) a plurality of optical path switching elements accommodated in said housing to switch said input optical path into any one of said output optical paths, each of said optical path switching elements having a plurality of reflection surfaces including a first reflection surface to reflect said light beam inputted from said input optical path of said inputting means and a second reflection surface to reflect said light beam reflected from said first reflection surface to be outputted into any one of said output optical paths of said outputting means, wherein said first and second reflection surfaces of said optical path switching elements are formed respectively by first and second flat mirrors securely mounted on surfaces of said optical path switching element, and (iii) a plurality of actuation elements accommodated in said housing to respectively actuate said optical path switching elements, each of said optical path switching elements being actuated and moved by each of said actuation elements with respect to said housing, each of said actuation elements to assume two different positions including a first position in which said input optical path of said inputting means is switched to any one of said output optical paths of said outputting means and a second position in which said input optical path of said inputting means is not switched to any one of said output optical paths of said outputting means.

10. An optical path switching apparatus as set forth in claim 9, in which each of said first and second reflection surfaces of said optical path switching element are angled with respect to each other at an angle of about 45 degrees to form a reflection space allowing said light beam to pass from said first reflection surface to said second reflection surface while said light beam from said input optical path to said first reflection surface is passed from said second reflection surface to said output optical path.

11. An optical path switching apparatus as set forth in claim 9, in which said inputting means and outputting means are disposed to have each of said input optical path and each of said output optical paths be directed in perpendicular relationship with each other, respectively.

12. An optical path switching apparatus as set forth in claim 9, in which said inputting means and said outputting means are disposed to have said input optical path and said output optical path be directed in parallel relationship with respect to each other, and further a pair of said optical path switching elements, on each of which a light beam is respectively reflected at an angle of 90 degrees, are arranged for a path of one light beam to switch each of said input optical path into any one of said output optical paths which oriented in opposite directions with respect to each of said input optical path.

13. An optical path switching apparatus for switching an input optical path selectively into any one of output optical paths, comprising:

switching means for switching said input optical path selectively into any one of said output optical paths, said switching means having a switching path to permit a light beam to pass therethrough;

inputting means for inputting said light beam to said switching means, said inputting means having said input optical path formed therein to have said light beam pass therethrough;

outputting means for outputting said light beam from said switching means, said outputting means having said output optical path formed therein to have said light beam pass therethrough; and said switching means including (i) a housing, (ii) a plurality of optical path switching elements accommodated in said housing to switch said input optical path into any one of said output optical paths, each of said optical path switching elements having a plurality of reflection surfaces including a first reflection surface to reflect said light beams inputted from any one of said input optical path of said inputting means and a second reflection surface to reflect said light beam reflected from said first reflection surface to be outputted into said output optical path of said outputting means and to form a reflection space defined between said first and second reflection surfaces, and (iii) a plurality of actuation elements accommodated in said housing to respectively actuate said optical path switching elements any each of said optical path switching elements being actuated and moved by each of said actuation elements with respect to said housing, each of said actuation elements to assume two different positions including a first position in which said input optical path of said inputting means is switched to any one of said output optical paths of said outputting means and a second position in which said input optical paths of said inputting means is not switched to any one of said output optical paths of said outputting means, wherein said inputting means and said outputting means are disposed to have said input optical path and said outputting optical path be directed in parallel relationship with respect to each other, and further a pair of said optical path switching elements, on each of which a light beam is respectively reflected at an angle of 90 degrees, are arranged for a path of one light beam to switch said input optical path into any one of said output paths which oriented in opposite directions with respect to said input optical path.

14. An optical path switching apparatus for switching at least one input optical path selectively into at least one output optical path, comprising:

switching means for switching said input optical path selectively into said output optical path, said switching means having at least one switching path to permit a light beam to pass therethrough;

inputting means for inputting at least one light beam to said switching means, said inputting means having said input optical path formed therein to have each of said light beams pass therethrough;

outputting means for outputting at least one light beam from said switching means, said outputting means having said output optical path formed therein to have each of said light beams pass therethrough; and said switching means including (i) a housing, (ii) at least one optical path switching element accommodated in said housing to switch said input optical path selectively into any one of said output optical path through a plurality of switching paths, said optical path switching element having a plurality of reflection surfaces including a first reflection surface to reflect said light beam inputted from each of said input optical path of said inputting means and a second reflection surface to reflect said light beam reflected from said first reflection surface to be outputted into said output optical path of said outputting means, wherein each of said first and second reflection surfaces of said optical path switching element are angled with respect to each other at an angle of about 45 degrees to form a reflection space allowing said light beam to pass from said first reflection surface to said second reflection surface while said light beam from said input optical path to said first reflection surface is passed from said second reflection surface to said output optical path.

\* \* \* \* \*